United States Patent [19]

Thorogood et al.

[11] Patent Number: 5,299,749
[45] Date of Patent: Apr. 5, 1994

[54] METHOD OF WINDING HOLLOW FIBER MEMBRANES

[75] Inventors: Robert M. Thorogood, Macungie; Robin J. Maliszewskyj, Hatfield, both of Pa.; Myron J. Coplan, Natick, Mass.; Pushpinder S. Puri, Chesterfield, Mo.

[73] Assignee: Air Products and Chemicals, Inc., Allentown, Pa.

[21] Appl. No.: 856,602

[22] Filed: Mar. 24, 1992

[51] Int. Cl.$^5$ ............................................. B65H 81/08
[52] U.S. Cl. ............................... 242/7.02; 210/497.1
[58] Field of Search ............... 242/7.02, 3, 7.14, 7.21; 210/497.1

[56] References Cited

U.S. PATENT DOCUMENTS

| | | |
|---|---|---|
| 3,794,468 | 2/1974 | Leonard . |
| 3,870,637 | 3/1975 | Miyoshi et al. . |
| 3,884,424 | 5/1975 | Bosquain et al. ............... 242/7.02 |
| 4,045,851 | 9/1977 | Ashare et al. . |
| 4,430,219 | 2/1984 | Kuzumoto et al. . |
| 4,529,139 | 7/1985 | Smith et al. ..................... 242/7.02 |
| 4,572,446 | 2/1986 | Leonard et al. . |
| 4,631,128 | 12/1986 | Coplan et al. . |
| 4,975,247 | 12/1990 | Bodolato et al. ............ 210/497.1 X |

*Primary Examiner*—Andrew M. Falik
*Attorney, Agent, or Firm*—Mark L. Rodgers; James C. Simmons; William F. Marsh

[57] ABSTRACT

Bundles of hollow filament membranes suitable for use in fluid separation, such as in the separation of air into gases more concentrated in oxygen and nitrogen are made in a cylindrical form and annular cross-section with multiple filaments of each layer lying in generally parallel helical paths at a common angle to the axis of symmetry of the bundle. Continuous lengths of filaments are laid down on the core while same is rotated first in a "forward" sense and the filament lay-down point is traversed from a first end of the core to the second, and then in a "reverse" sense while the filament lay-down point is traversed from the second end to the first. Reversing of the direction of core rotation and filament end-to-end traversal is repeated with said reversing controlled in such a manner that the path of the filament returning from either end to the other is displaced incrementally from that of the filament portion laid down in the immediately preceding traversal. Laydown of filament is repeated until a plurality of segments of filament all sharing the same helix angle and direction have formed a thin annular layer. The instant method can be precisely controlled to obtain bundles of desired packing density with consequent improved flow of fluid within the shell side of the bundle.

8 Claims, 6 Drawing Sheets

METHOD OF WINDING HOLLOW FIBER MEMBRANES

FIELD OF THE INVENTION

This invention concerns an improved configuration of hollow filament bundle and methods of forming same. In general it relates to the winding of hollow filament membranes on a cylindrical core to create an improved configuration of membrane bundle for installation in a module to be used for separation of the components of a fluid, for dialysis, or for heat transfer between two fluids. In a specific aspect, the invention relates to an improved hollow filament membrane bundle which is particularly useful in effecting separation of the components of a mixture of gases.

BACKGROUND OF THE INVENTION

Hollow filaments have found wide application in heat transfer, mass transfer and separations. In the separation processes it is common practice to apply a pressurized fluid mixture to the external surface of the hollow filaments made from a semi-permeable material having the propensity for permitting the selective permeation of one or more components of the mixture through the filament wall into its bore more rapidly than some other. The more permeable component(s) therefore are enriched in the bore relative to the composition applied under pressure to the external surface of the filament. The residue of the pressurized fluid remaining on the upstream surface of the filament membrane, consequently, is enriched in the less permeable component(s). The contents of the bore are removed from the module separately from the residue of pressurized feed fluid flowing along the external surface of the filaments. This process has become increasingly important for the separation of air into its principal components, oxygen and nitrogen.

In commercially feasible applications a relatively large surface area of membrane is required in any installation. Thus, practical use of hollow filament membranes requires assembling a large number of them into a unit, frequently called a bundle, which is then assembled into a module with appropriate conduits to pass a feed mixture over the external surfaces of the filaments, to remove permeate from the filament bores, and to remove feed residue.

An alternative arrangement for the use of hollow filaments provides means to introduce pressurized feed into the filament bores, so that permeation of the more permeable components is from the bore to the outside surface of the filament. The arrangement of feed, permeate and residue conduits is, therefore, different from that of the case of "shell-side" feed. Although the flow dynamics of bore-feed operation are different from that of shell-side feed, for either case there is a decided advantage in having a filament bundle of regulated and essentially uniform packing density, adequate distribution of inter-filament spaces and generally uniform filament length.

In shell-side feed, particularly, flow patterns of the feed, residue, and permeate are very important in determining the efficacy of the separation sought. It is widely recognized that geometry of the bundle assembly has a significant influence on these. It is desired that the feed gas on the outer surface of the filaments be in true counterflow mode against the permeate flow in the filament bores. It is also desired that the path lengths within the bores be essentially uniform, and the local flow velocities on the shell side be both relatively high and uniform from point to point within any plane intersecting the bundle at right angles to its long axis.

These several considerations dictate certain geometric requirements for the bundle which thereby place high demands on the bundle assembly process. First, variability of filament-to-filament packing density would desirably be nil. Second, to maintain a relatively high shell-side flow velocity, the packing density should optimally be quite high, namely in the order of 50-70%. Third, feed flow along the outside surface of the filament should be directed as much as possible parallel to the length of the filament whether the filament is straight or follows some curved path, which generally requires that the aspect ratio (bundle length to bundle diameter) be at least three and as much as ten. Fourth, however, there is the requirement that bore path length not introduce undesirable restriction on flow and consequent undesirable permeate pressure.

In attempting to meet these objectives the configurations of hollow filament bundles has heretofore taken a number of different forms including (a) arrays of parallel, straight or nearly-straight lengths of filament; (b) arrays of grossly parallel lengths of crimped filament; (c) lengths of active filament interwoven with inactive filaments; (d) filaments braided into groups; (e) arrays of filament formed into helices wherein an equal number with an "s"-direction helical path interlace with filaments following a "z"-direction helical path; and (f) helical filament arrays comprising discrete layers wherein parallel filaments all lying in "s"-direction helices adjoin filaments of an adjacent layer all lying in "z"-direction helical paths and in which there is no interlacing of filaments of opposite helix direction.

The first two arrangements generally suffer from at least some, and sometimes considerable variation in local filament packing density. The result of this is that flow along the outside of the filaments can be high in some regions or effectively stagnant in others with consequent deleterious effect on the fluid dynamic requirements for optimum separation performance. The third and fourth methods tend to provide more uniform packing density but lead to complexities and high costs in the assembly process.

The last two general approaches are partially responsive to packing density considerations but introduce undesirable flow perturbations. They also may suffer in respect to filament length uniformity unless special attention is paid to control of the helix angle of the filaments. They are, however, appealing from the manufacturing point/of view and exploited as illustrated in U.S. Pat. Nos. 3,794,468; 3,870,637; 4,045,851; 4,430,219; 4,572,446; and 4,631,128. In all these cases the filaments are wound on a support element constantly rotating in one direction as filaments are laid down on the support in a continuous path which traverses the support from one of its end to the other. The combination of mandrel rotation and filament end-to-end traversal results in accumulating on the support element lengths of filament all lying in helical paths. Because the rotation continues in one direction when the filament traverse direction is reversed, the length of filament deposited on any traverse from a first end to a second end lies in an "s-"direction helix, and in a "z-"direction when the traverse is from the second end back to the first.

SUMMARY OF THE INVENTION

The instant invention is distinguished from these several methods known in the art in that when the traverse direction is reversed after a length of filament has been laid down on the support element, the direction of rotation of that element is also reversed. The net result is that successive lengths of filament are accumulated on the support element all lying in the same helical direction. There is no interlacing of "s"-direction lengths with "z"-direction lengths, as taught in U.S. Pat. Nos. 3,870,637; 4,045,851; 4,430,219; and 4,572,446. Also, there is no accumulation of "s"-direction lengths on one side of the bundle and "z"-direction lengths on the other side as taught by U.S. Pat. Nos. 3,794,468 and 4,572,446.

Rather, each successive length of filament is laid down on the support element in the same helix direction. In order to avoid building these lengths on top of one another there is slight controlled asynchrony between the reversal of rotation and the reversal of traverse so that successive lengths of filament are laid down parallel to but slightly displaced around the circumference of the support from the predecessor length laid down in the preceding traverse. This relationship is maintained for several successive reversals of rotation and traverse until the lengths of filament deposited on the core, all displaced circumferentially, create a helical array completely enwrapping the support. The process may be continued with no change in the helix direction and with successive lengths displaced around the circumference until one or more additional complete bundle over-wraps have been applied.

When a desired number of filament lengths have been laid down they have accumulated into a layer wherein all the filaments share the same helix angle and direction. The helix direction is then changed by eliminating one reversal of support rotation when a traverse reversal occurs. Thus, while the several preceding lengths of filament had all been laid down in, say, an "S"-direction helix, by continuing to rotate the support element in the same direction at the time of traverse reversal, the next length is laid down in a "z"-direction helix. This new combination of reversal of traverse and rotation is then repeated a desired number of times until a second layer of filament lengths all lying in paths in the opposite helical sense without any interlacings, has been accumulated lying atop the preceding layer and with each layer completely enwrapping the circumference of the support element and any layers of filament previously laid thereon.

Each layer, whether applied directly onto the support element or upon a layer already so deposited, may be formed at a selected helix angle which generates a specified end-to-end length of filament. Thus, the filaments nearest the support element may lie at a greater angle to the core axis than those in the outer layers. In general all helix angles will be substantially less than 90° and most desirably less than 45°. This latter is not a requirement of the instant invention, although it will be recognized by those familiar with the art that filament paths at a low angle to the core axis are better oriented for counterflow operation.

The method for forming the hollow filament membrane bundle according to our invention can be defined in a series of steps in which the membrane is wound about a cylindrical core. In a first step, the filament is laid down on a support element, preferably a rotatable cylindrical mandrel whose direction of rotation is reversed when the filament lay-down point reaches one end of the bundle and is caused to return to the other end of the bundle. These rotation and traverse reversals are slightly asynchronous, so that the actual point from which the filament path starts back upon reversal of traverse direction is slightly displaced circumferentially around the support element from the point at which it arrived at the end of the preceding traverse so that filament paths of successive lay-downs do not lie atop one another. The filament lengths form a layer completely enwrapping the support element; they share a common helix direction and angle generally, but not necessarily, less than 45° to the core axis. The hollow filament is laid down at a steady state from a first point at or near one edge of the mandrel surface to a second point which is at or near the opposite edge of the mandrel surface, and during this laying down of filament from one edge of the mandrel to the other, the mandrel is rotated in one direction about its axis so that the path of the fiber lies at an angle to the axis. The method is continued by laying down fiber on the mandrel from a third point at or near the second edge of the mandrel surface to a fourth point at or near the first edge of the surface and the mandrel is rotated during this step at a constant speed equal to that of the first step, but in the opposite direction of rotation as in the first step, so that the path of the filament laid down in this latter step is parallel to, but not the same as the path of the filament laid in the first step. The procedure is then continued by laying down filament in multiple passes back and forth on the mandrel surface alternating these passes from points at or near a first edge of the surface to points at or near the second edge and from points at or near the second edge back to points at or near the first edge while rotating the mandrel at a constant speed, but in different directions for alternate paths along the mandrel. So that each pass lays down filament along a path which is parallel but not overlapping the paths of filament previously laid down until a desired packing fraction of filament on the surface is obtained in a first layer. Subsequently, the same steps are repeated in order to lay down a second layer of filaments on the first layer. As the second layer is formed, the first layer defines the surface of the mandrel on which the second layer is developed and these steps are repeated for subsequent layers of filament and until a bundle of desired thickness is obtained. Our invention also provides an improved fluid separation bundle of hollow filament membrane which can be placed in a fluid separation module. The bundle is cylindrical in form and annular in cross-section and is made up of multiple layers of hollow filament, the filaments of each layer lying parallel to each other along paths forming an angle, preferably but not necessarily, less than 45° with the axis of symmetry of the bundle.

IN THE DRAWING

DETAILED DESCRIPTION OF THE INVENTION

Figure 1D:
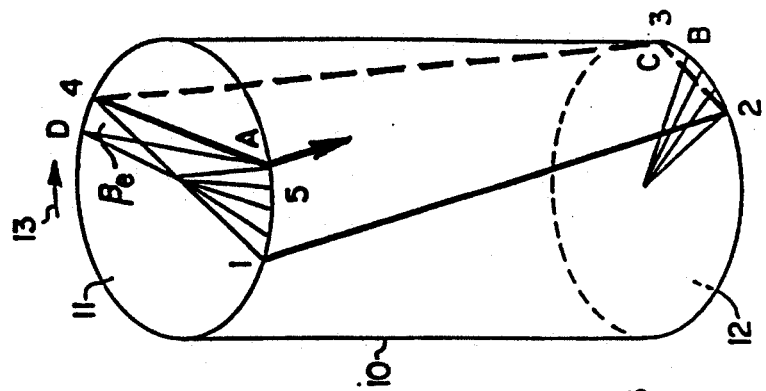
FIGS. 1a–1d are schematic representation,%in four sequential views of filament as it is laid down upon a cylindrical mandrel according to methods found in the prior art
Figure 1C:
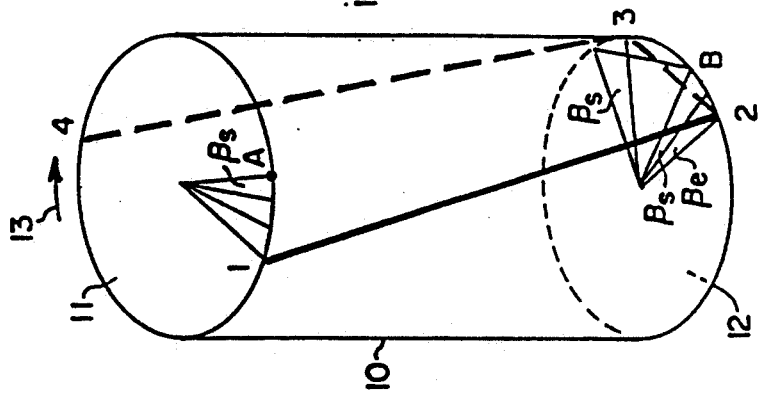
Figure 1B:
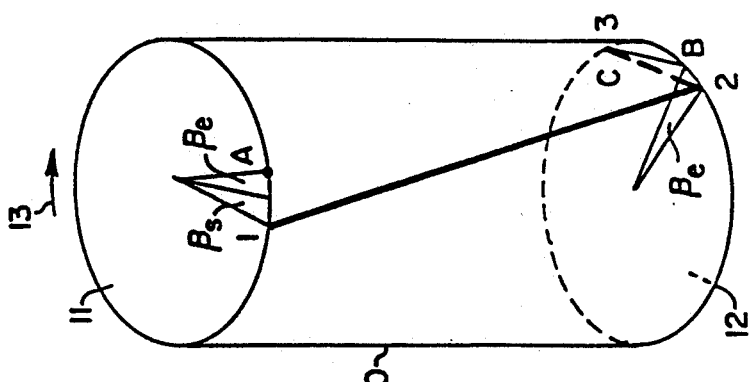
Figure 1A:
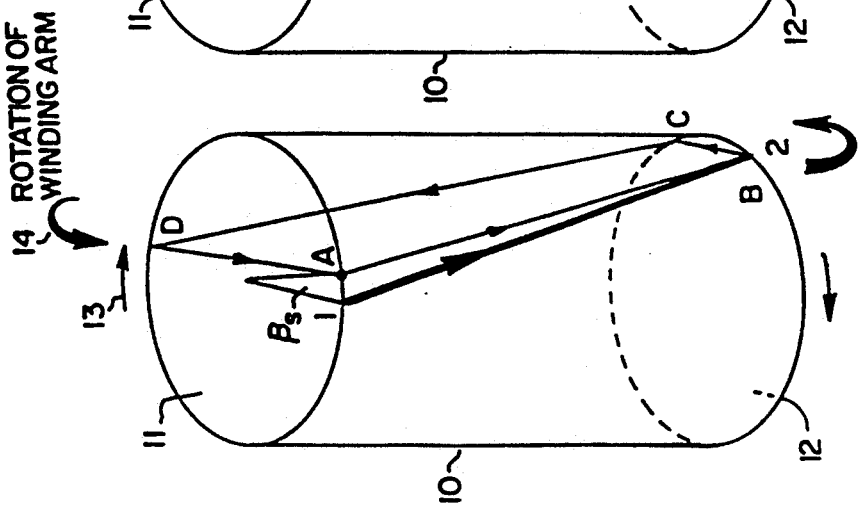
Figure 2D:
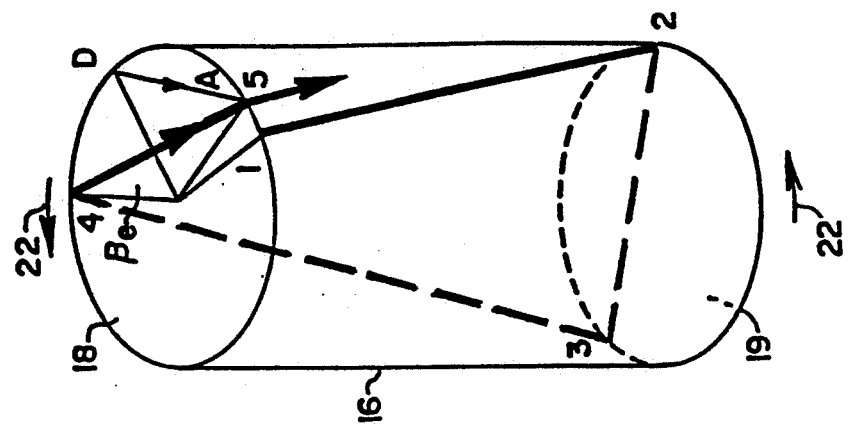
FIGS. 2a–2d are schematic representations in four sequential views of filament being laid down upon a cylindrical mandrel according to the method of this invention.
Figure 2C:
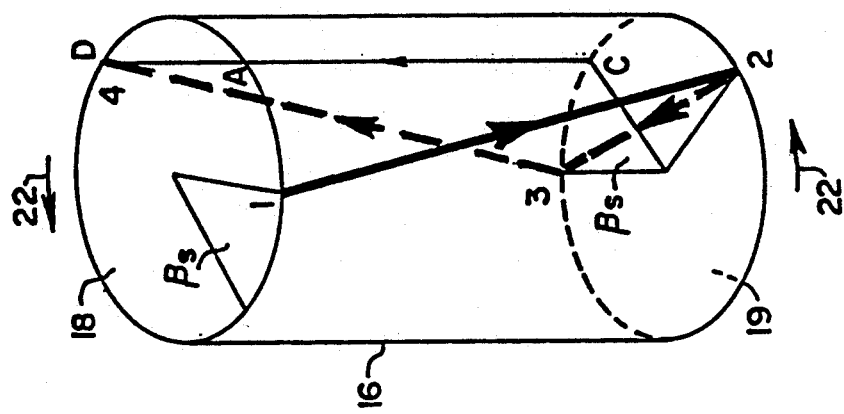
Figure 2B:
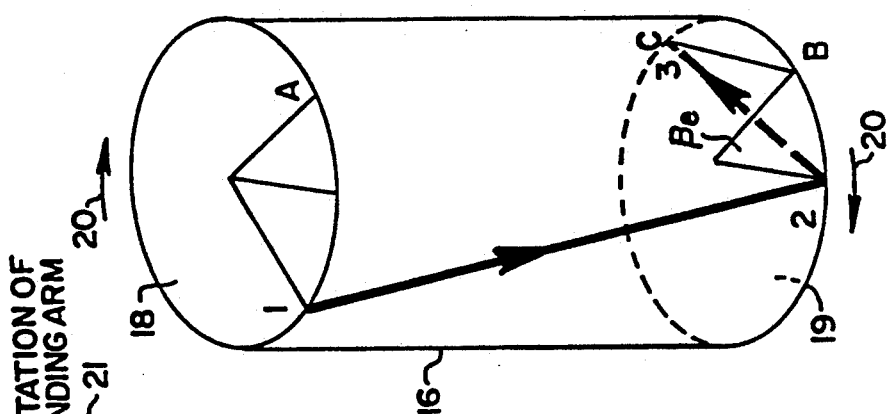
Figure 2A:
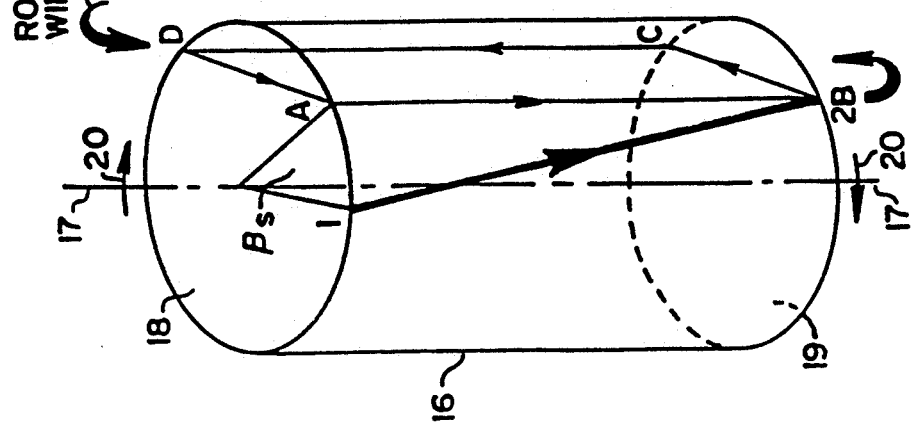

This invention is an improved process for manufacturing a hollow filament membrane bundle for use in a fluid separation module and also provides an improved filament bundle in which the packing fraction of the filaments are controlled throughout the cross-section and length of the filament bundle. The invention uses a change of rotation direction of a central mandrel on which the filament bundle is formed, this change of rotation direction occurring asynchrononsly with each traverse of the filament dispensing device. In this way, the filament is placed on the surface of the mandrel or upon already deposited layers which serve as the mandrel surface parallel to, but not on top of, the preceding filament length laid down and in the same helical sense. Successive lengths of filament fill out a circumferentially complete environment. A winding arm may be used to lay down the filament by a circular motion around the mandrel, such as is shown and described in U.S. Pat. No. 4,572,446, discussed above. By operating in accordance with this invention the chord lengths of filament laid down across the ends of the mandrel are equal at each end and the axis of the mandrel and the plane of the filament dispensing arm are retained parallel. Because of this, the mandrel can be supported at each end during winding which is particularly important in the manufacturing operation for the formation of bundles which are relatively long in relation to their diameter. For example, when the mandrel has a length to diameter ratio greater than 2, it is helpful if the mandrel can be supported axially at both ends, while the filament bundle is being formed and this invention enables such an operation.

In the improved method of this invention it is possible to apply filament at an acute angle of less than 45° to the axis of symmetry of the filament bundle. This angle is the same for all of the filaments in each layer and the filaments in each layer lie in parallel paths without crossovers which reduce the packing fraction. Close spacing of the filaments is thereby achieved and packing fractions on the order of about 0.5 to 0.7 are readily obtained, for example with a packing fraction of 0.5, the distance between centers of successive filaments is 1.57 times the filament diameter. In the instant invention fibers in each layer are parallel and the angles of the filaments in adjacent layers are reversed, but the filaments in any single layer lie in parallel paths, but at an angle to those in adjacent layers. The bundle can also be formed with a packing fraction which is constant throughout the radius of the bundle and the filament angle to the axis may be varied or constant throughout the radius of the bundle. Because of these characteristics a uniform flow of fluid through the filament bundle can be achieved with minimum pressure drop both inside and outside of the filaments consistent with economic design. One of the particular advantages of this invention is that the filament bundle can be formed so that the number and relative position of layers in which the filaments are parallel and layers in which the filaments lie at angles to the filaments in other layers can be programmed into the construction of the bundle to achieve the desired objectives of fluid flow for specific fluid separations and their requirements for high productivity.

In understanding the invention, it is helpful to understand the operation of prior art methods of making hollow filament bundles which may appear to be similar but achieve significantly different results. FIG. 1 illustrates a prior art operation in four successive diagramatic views, 1a, 1b, 1c, and 1d. In each view of FIG. 1, views a-d, the mandrel is rotated continuously in the clockwise direction indicated by arrows 13. The description applies the same to the first layer which is placed on the mandrel and for continuing layers of filaments which are formed upon the layers of filaments previously put down. Filament attached to the mandrel surface at point 1 is dispensed from a winding arm in the plane ABCD and travels downwards in front of the mandrel to point 2, while the mandrel rotates through a small angle $\beta s$. The filament then passes across the bottom end 12 of the mandrel from point 2 to point 3 following a path indicated by the dotted line between these two points. While the mandrel rotates through a small angle $\beta e$. This is shown in view 1b. The procedure is repeated as shown in views 1c and 1d to complete the return path of the filament from points 3 to 4 on the upper edge of mandrel 10, following a path shown by the dotted line from point 3 at surface 12 to point 4 at end surface 11. As the filament is laid down from point 3 to 4, the mandrel 10 is also rotated through a small angle which is equal to $\beta s$. Finally, the filament is laid down across the surface of mandrel end 11 from point 4 to point 5 while mandrel 10 rotates in a clockwise direction through angle $\beta e$. Point 5 is spaced from point I at the edge of mandrel 10 where it adjoins end 11 and the spacing between points I and 5 is determined by the total angle of rotation ($2\beta s + 2\beta e$) during one rotation of the winding arm. In order to achieve a practical packing fraction for the filament, this total angle of rotation must be quite small and, consequently, the angle of the filament to the mandrel axis is determined primarily by the angle between the winding plane and the axis of the mandrel. This angle is limited by the relative diameter to length ratio of the mandrel and the permissible positions of the chords between points 2 and 3 on the end portion 12 and between points 4 and 5 on mandrel end 11 which will retain the filament without slippage. If the angle is too shallow between the winding plane and the mandrel axis, the filaments tend to become embedded in adjacent layers and this can lead to excessive local flow resistance. Increasing this angle in the manner described by U.S. Pat. No. 4,572,446 requires crossing the winding plane over the axis of the mandrel which is permissible only if the mandrel is supported entirely from one end during winding. This, of course, is impractical for winding long bundles.

Referring now to FIG. 2 a corresponding description of the laying down of filament can be described according to the present invention. FIG. 2 has four successive views (2a, 2b, 2c, and 2d). In each view mandrel 16 is illustrated having flat ends 18 and 19 and as shown in view 2a, mandrel 16 rotates on an axis 17. In views 2a and 2b, mandrel 16 rotates clockwise as indicated by arrows 20. While a winding arm, not shown, rotates in a plane indicated by ABCD in the direction indicated by arrow 21. The plane of rotation of the winding arm as illustrated in FIG. 2, lies parallel to the axis 17 of the mandrel. Some angular orientation between the plane of rotation of the winding arm and the axis of the mandrel is permissible, but according to the invention method, such an angle is not relied upon to achieve a stable chord length for the filament as it passes over the flat ends of the mandrel. As shown in FIG. 2a the filament is laid down from point 1 on the edge of the mandrel 16 at end 18 to point 2 at the opposite edge of mandrel 16 at end 19. As the winding arm traverses along the plane A to B and the mandrel rotates in the clockwise direction as indicated by arrow 20 through βs. As shown in view 2b filament is laid down across end 19 from points 2 to 3 as indicated by the dashed line as the winding arm continues in its plane of rotation from B to C. Simultaneously mandrel 16 rotates clockwise through angle βe. As a result, filament is laid down on a chord line from points 2 to 3, a distance which is greater than would have been the case if the mandrel had not been rotated and greater than if the mandrel had been rotated counter clockwise. As the winding arm continues to rotate passing through points C and D in its plane of rotation, mandrel 16 is-reversed in its direction of rotation to rotate counter clockwise as indicated by arrows 22 at the same rate as the , clockwise rotation indicated for views 2a and 2. This is shown in views 2c during which time filament is laid down on the mandrel surface from point 3 on the edge of the mandrel adjacent side 19 to point 4 on the edge of the mandrel adjacent end 18. As Indicated by dashed line from points 3 to 4 As shown in view 2d, the mandrel continues to rotate counter clockwise indicated by arrows 22, as the winding arm rotates passing through points in its plane D to A and the filament is laid down on end 18 from point 4 to point 5. As the filament is laid down from point 3 to point 4 on the surface of the mandrel (view 2c), the mandrel rotates through angle βs and as the filament is laid down across end 18 (view 2d) the mandrel is rotated through angle βe, these angles corresponding to the same angles of rotation as illustrated in views 2a and 2b. Point 5 is adjacent to point 1 on the edge of the mandrel adjacent to end 18 and is displaced to be ahead or behind point 1 by an amount equal to the required pitch between centers of the filament to achieve the correct packing fraction. The operation then continues as from points 1 to 2 with a reversal of mandrel rotation to clockwise, repeating the steps shown in views 2a through d. The filament paths from points 1 to 2 and from points 3 to 4, while appearing to cross in the isometric schematic of FIG. 2, are actually parallel on the surface of the mandrel 16, so that as repeated wrappings of hollow filament are made on the mandrel, all of the filaments laid down in a single layer lie parallel to each other. Also, βs plus βb equals 180° plus or minus one-half βp, where βp is the angle for the required pitch between filaments. The angle between the filament and the mandrel axis is adjusted by changing βs with the plane of rotation of the winding arm parallel to the mandrel axis.

Figure 3:
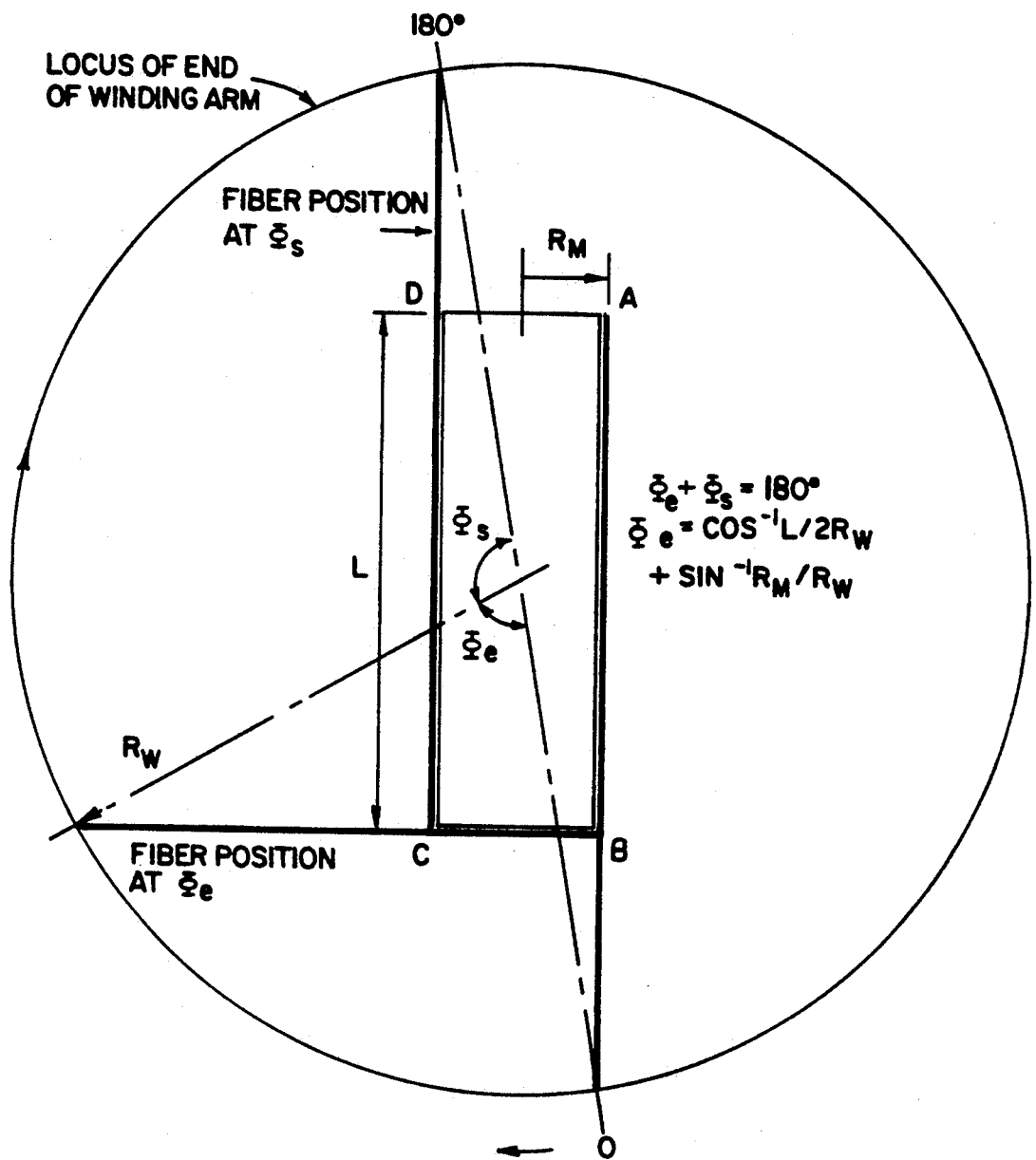
FIG. 3 is a diagramatic representation of the relative positions of a winding arm as it passes around and winds filament upon a cylindrical mandrel, the mandrel having flat ends.

The relationship between βs and βe is determined by the time taken to reverse mandrel rotation and the shape of the mandrel end. In FIG. 3, the rotation of the winding arm around a mandrel with flat ends is depicted. As filament is laid down from point B to C across the end of the mandrel, the arm rotates through angle Φe. As fiber is laid down from points C to D along the length of the mandrel the arm rotates through angle Φs. These angles are determined by the relative geometries of the mandrel and winding arm, thus $$\Phi e = \cos^{-1}\frac{L}{2R_W} + \sin^{-1}\frac{R_M}{R_W} \text{ and } \Phi e + \Phi s = 180°$$

where
L - length of mandrel (or bundle)
$R_M$ - radius of mandrel (or bundle)
$R_W$ - radius of winding arm The relationship between the mandrel rotation and winding arm rotation angles is given by $$\frac{\beta s}{\beta e} = \frac{\Phi s}{\Phi e}$$

Figure 4:
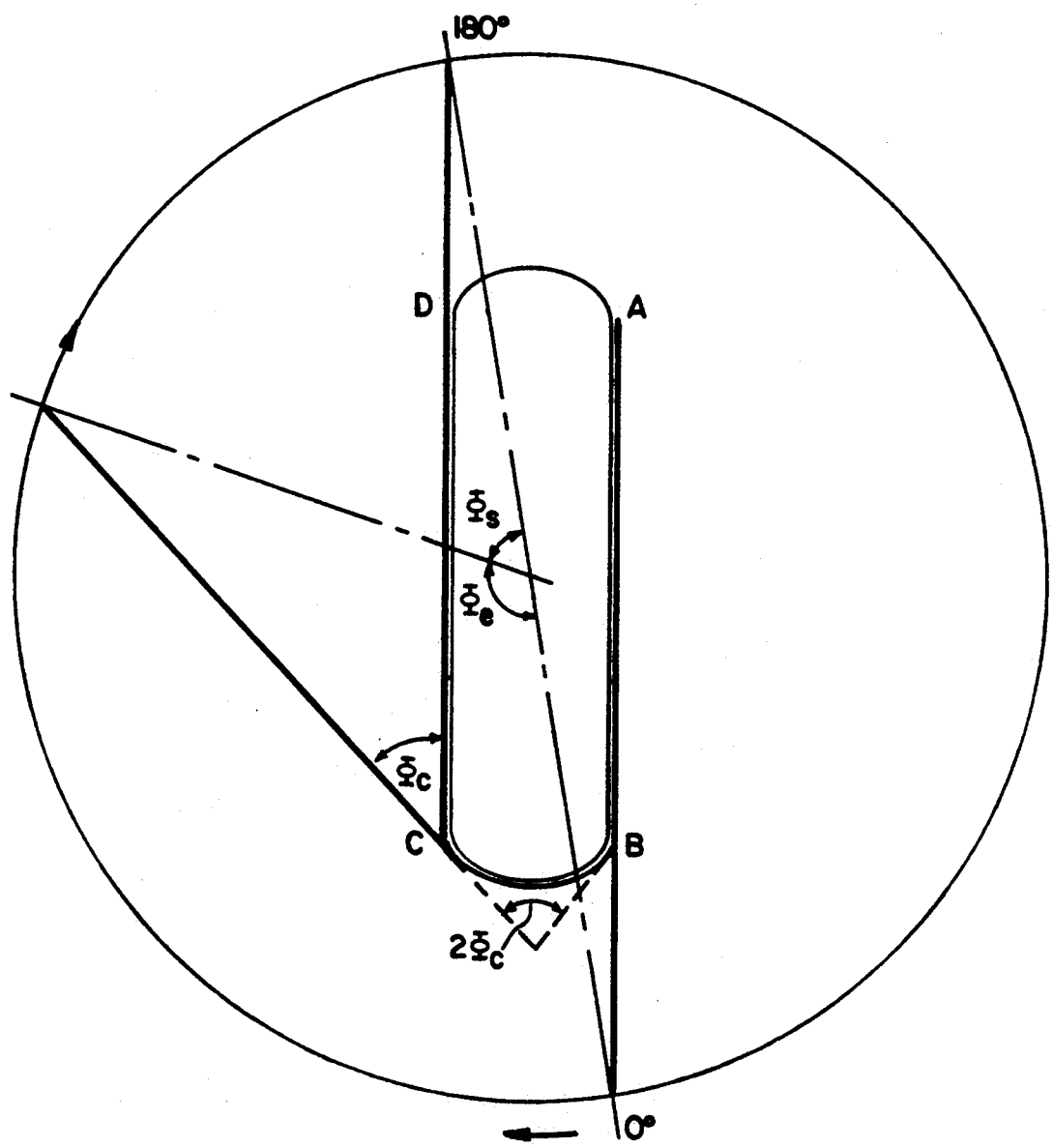
FIG. 4 is a diagramatic representation of the relative movement of a winding arm and a cylindrical mandrel in which the mandrel has shaped ends.

The fixed relationship between Φe and Φs may be modified by providing a shape to the end of the mandrel. The ratio of Φs to Φe may be decreased as shown in FIG. 4 by providing a contact angle Φc for the filament with the mandrel and such as would be obtained with a conical end with an apex angle equal to 2Φc. Such a shaped end also serves a purpose of laying the filament down on a curved path across the end of the mandrel such that it does not intersect with the drive spindle of the mandrel. Thus, considerable flexibility is provided for control of the winding angle of the filament to the axis of the bundle.

When a complete layer has been formed on the surface of the mandrel, the next layer is wound over the first layer which defines the surface of the mandrel on which the second layer is developed. This procedure is repeated until a bundle of the required thickness has been formed. Operating in this manner with continuous reversal of rotations of the mandrel between every path laying down filament on the mandrel surface, produces a bundle in which all of the filaments lie in paths which are parallel, or substantially parallel to each other. The length of the filaments laid down can be developed more precisely by adjusting the speed of rotation of the mandrel as the filament bundle grows in thickness. Since as additional filament layers are laid down, the operative diameter and surface area of the mandrel surface increases, the speed of rotation of the mandrel can be reduced slightly as each addition of a filament layer increases the effective surface of the mandrel so that constant fiber length throughout the bundle is achieved.

In a preferred embodiment of the invention the filament bundle is built up so that all of the filaments in each layer lie in paths which are parallel to each other, but the filaments in adjacent layers lie at a reversed angle and cross over the filaments in the other adjacent layers. For example, a first filament layer can contain filaments all of which lie at an angle of 10° to the filament axis, while the filaments in the next adjacent layer all lie at an angle 20° displaced from the angle of the filaments of the first layer, but also at 10° to the filament axis. The filaments in the third layer would be in paths parallel to those of the first layer and those in the fourth layer parallel to the filaments in the second layer. This is accomplished by omitting the mandrel rotation reversal for the first half rotation of each new layer. Once a single reversal has been omitted then the mandrel continues to reverse as indicated in connection with FIG. 2 for laying down all of the rest of the filaments in that particular layer. The filament bundle thus produced has improved flow characteristics with dense and consistent filament packing fraction, which produces very good flow characteristics for the fluid feed mixture passing along the length of the filament bundle. All of the filaments of any given layer share a common helix direction which is opposite to that of the filaments which lie in the adjacent layer, but the filaments do not interlace. By controlling the omission of the single reversal which results in changing the helix direction of the subsequently laid down filaments, layer thickness may be built up from 1 or 2 filament diameters to several such diameters. The helix angles can be systematically reduced moving from layer to layer from the core to the bundle periphery in order to keep the effective lengths of the filaments the same throughout the bundle.

Figure 5:
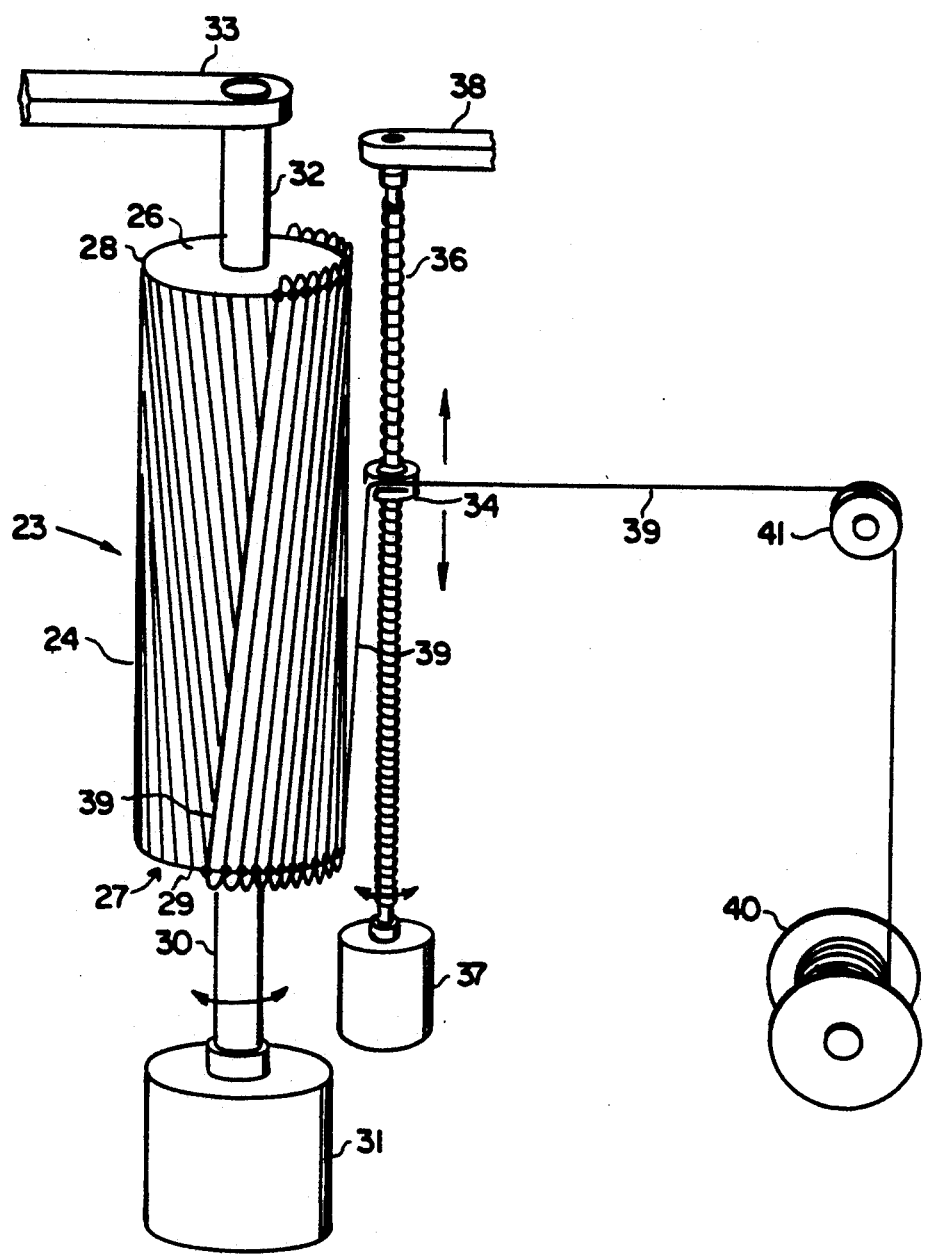
FIG. 5 is a perspective view of a mandrel upon which filament is being laid down using a traverse guide-rather than a winding arm.
Figure 6D:
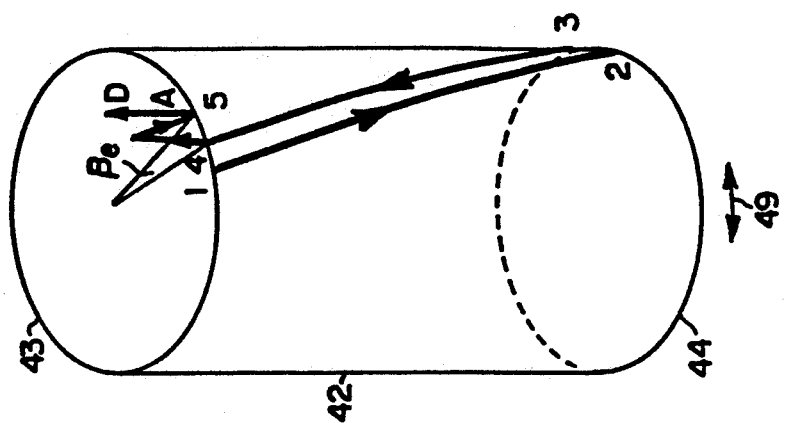
FIGS. 6a-6d are schematic representations four views of the linear travel of filament on a cylindrical mandrel as it is laid down using a traverse guide such as that illustrated in FIG. 5.
Figure 6C:
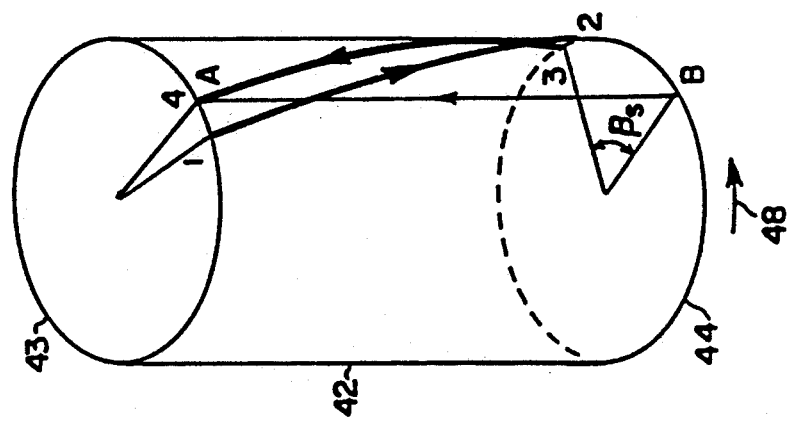
Figure 6B:
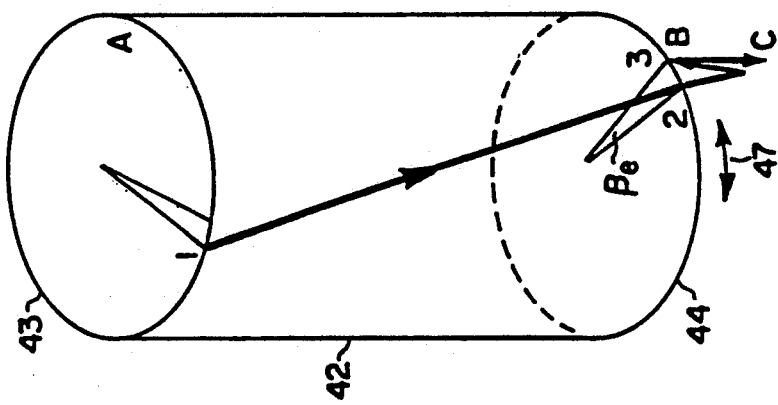
Figure 6A:
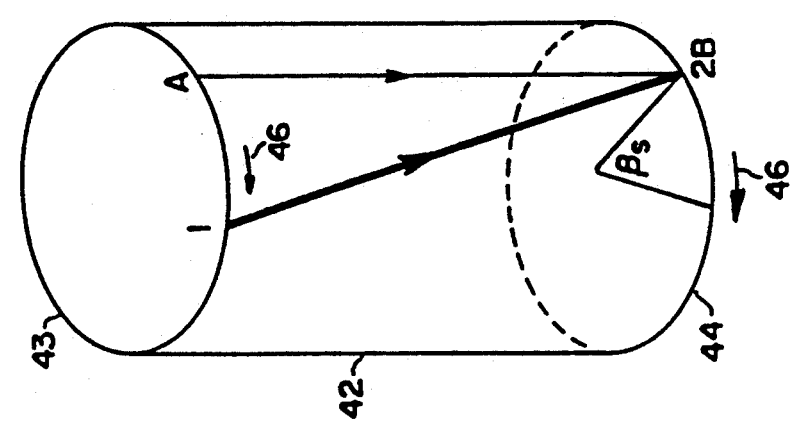

Referring now to FIG. 5, another embodiment of the invention is described in which a traverse guide replaces the winding arm which has been described in connection with FIGS. 2, 3 and 4. As shown in FIG. 5, a mandrel 23 is shown having a right cylindrical surface 24 and flat ends 26 and 27. The mandrel surface 24 has two circular edges, 28 (adjacent end 26) and 29 (adjacent end 27). The surface 24 is also symmetrical about an axis on which lies drive shaft 30, driven by a motor 31 and support shaft 32 mounted in support bearing 33. Filament is supplied by traverse guide 34 which is mounted on helical gear shaft 36 driven by motor 37 and supported in bearing 38. Hollow filament membrane 39 from supply spool 40 is guided over a wheel 41 through the center of traverse guide 34 and is applied to the surface 24 of mandrel 23 as the traverse arm moves back and forth along the length of the mandrel as driven by reversing rotations of shaft 36 and motor 37. As the filament completes each traverse, it is secured to a point on the mandrel at edges 28 and 29 or at points very near these edges by means to be subsequently described. The rotation of mandrel 23 in cooperation with the traverse of guide 34 is described in connection with FIG. 6. It is apparent, however, by the embodiment illustrated in FIG. 5, that the mechanism for supplying of filament to the filament bundle is considerably simplified using a traverse arm and also that filament waste is reduced in the layers which are not required to cross the end of the mandrel or the bundle. Although FIG. 5 depicts the relationship of the mandrel and its operation as vertical, this is done for consistency in connection with the other embodiments described and in operation can be more readily affected in a horizontal arrangement of the mandrel. Also, more than one traverse guide can be disposed equal angularly around the mandrel in order to shorten the time required for fabrication of a bundle. Moreover, more than one filament can be dispensed simultaneously at each traverse location. It should be understood however that multiples of filament application can also be achieved using more than one winding guide or more than one filament dispensing device in the same fashion. Referring now to FIG. 6, four sequential operations are shown in the four views 6a, 6b, 6c and 6d. In each view of a through d, mandrel 42 is shown as having an upper circular edge 43 and a lower circular edge 44. filament is laid down along the mandrel surface from points I to 2, while the filament traverse arm moves from point A to B and the mandrel rotates clockwise through angle $\beta s$ as indicated by arrows 46. The filament is attached to the mandrel or the previous filament layer at point 2 with a quick setting adhesive such as cyanoacrylate with an accelerator or a thermo setting polymer. In the next step depicted by view 6b, the mandrel rotation direction is reversed and the traverse arm moves from C to B and back to B producing a short filament loop. The reversal of rotation during this step, which can be very brief, is shown by double arrow 47. During this movement, the mandrel makes a net clockwise rotation of $\beta e$ which determines the pitch between successive filament positions. The filament is then attached at point 3 such as with an adhesive as described, and any suitable mechanism, not shown, can be used to hold the filament loop formed during the traverse arm movement from position B to C and return to B until the adhesive is adequately set.

In the next step shown in view 6c, the filament is laid down from point 3 on the circular edge 44 of mandrel 42, or from a point very close to this edge, to point 4 which is on circular edge 43 or very close to it, while the mandrel rotates counter clockwise through angle $\beta s$ which is the same angle of rotation in the first step shown in view 6a. During this step the traverse arm moves from position B to A and the filament is then attached by adhesive at point 4. In the last step of the sequence shown in view 6d, the traverse arm moves from position A to position D and then back to position A forming a filament loop at the same time mandrel 42 reverses direction of rotation from the direction indicated-by arrow 48 in view 6c to the opposite direction of rotation as indicated by a double arrow 49 in view 6d. During this movement the mandrel again makes a net clockwise rotation of an angle equal to $\beta e$, so that when the filament is returned to a point at or near the circular edge 43 of mandrel surface 42, it is at point 5 advanced from point 4 a distance selected to provide the desired packing fraction of the filament. In like manner an adhesive is applied to secure the filament at point 5 and the steps as depicted in view 6a through d are repeated until the complete layer of filament has been formed. The next layer can be formed with filaments at the same angle as the first layer or with the filaments at a reverse angle to those of the previous layer. Reversing the angle of the filaments is accomplished by omitting the reversal of direction of the mandrel in the step shown in either view 6b or 6d after laying down the last filament of the completed layer. As described previously, a single omission of a reversal of direction while laying down a filament across the surface of the mandrel and then continuing the reversals as alternate passes are made applying filament to the mandrel surface accomplishes this reversal of helix angle or direction for the filaments in the layers. As described previously the adjacent layers of filaments can have filaments in paths which lie in parallel lines or the lilies can cross with alternate layers of filaments being in parallel paths. Any combination of this change in helix direction from layer to layer or groups of layers to other groups of layers can be accomplished by programming regular reversals and omissions of single reversals at the beginning of the desired layer formation when a reversal of direction is desired. Also in the embodiment using the traverse arm, the speed of rotation of the mandrel can be adjusted during the winding of successive layers to provide a constant pitch between adjacent filaments in order to maintain a constant packing fraction of the filaments. This adjustment entails changing the mandrel speed in inverse proportion to the radius of the filament layer. This reduces the difference in lengths which would otherwise occur between the filaments from the core to the periphery of the filament bundle.

Upon completion of the winding of the bundle to the required diameter in either embodiment, one or both ends of the bundle are encapsulated in a potting resin and the end faces of one or both ends of the potted zones are cut to provide access to the inner bore of the filaments for fluid flow. Upon mounting this bundle the ends of which are potted in this manner, in a suitable shell, the potting resin serves as a tubesheet for the hollow filaments and enables the separation of fluid flow between the bores of the filaments and their exteriors for effective separation of fluid components.

There are several operational advantages for the method of this invention over those of the prior art, one of which is that the plane of rotation of the winding arm can be parallel to the axis of the mandrel and does not have to be pitched in order to produce the desired angle for the filaments. This in turn enables a shaped end of the mandrel to be used when using a winding arm in order to provide control of the winding angle along the bundle and facilitate laydown of the filaments around the spindle supporting the mandrel. When using an adhesive for attachment of the filaments and a traverse arm as shown in FIG. 5, the filament waste is considerably reduced since it is not necessary to completely cross over the ends of the mandrel before proceeding with another pass of filament laydown on the mandrel surface. More importantly the filament is maintained at a constant angle to the mandrel axis and as a consequence has a constant length throughout the bundle by the continuous adjustment of rotational speed of the mandrel from layer to layer, or from groups of layers to other groups of layers. The adjustment of rotational speed of the mandrel also maintains a constant pitch between filaments and achieves a constant packing fraction with varying bundle diameter. While the number of filaments in any given layer varies in proportion to the diameter of the bundle.

The invention can be used to build hollow filament bundles from any membrane material which is known to effect the separation of fluid components by permeation of the semipermeable membrane. A potting resins for sealing the ends of the filaments are well known, such as epoxies, or polyurethanes, and the filament bundles can be secured in impermeable plastic cartridges made from material such as polyethylene or polypropylene. The construction of separation modules using filament bundles of this type are well known and this invention can be applied advantageously to the formation of hollow filament membrane bundles for any separation purpose.

When using the traverse arm embodiment of the invention, the hollow filament is engaged by suitable means so that reversing the traverse direction does not result in removing the last length of filament laid down on the surface of the mandrel or prior filament layer. The result of this operation is to consume only as much filament as is needed for the active length of the filament bundle, plus the region of the filament that must be infused with potting compound, plus some small additional amount of filament which may be lost in the process of engaging the filament at the point of traverse reversal. The traverse and core rotation motions are each controlled with sufficient precision to permit exact placement of each filament length in a position displaced circumferentially on the mandrel surface, by a determined amount from the last preceding length of filament laid down. The operation lends itself very well to a computerized operation with known and available precision digital drive motors.

A number of different means can be used to secure the filaments at or near the ends of the bundle as the filaments are laid down. For example a strand or strands of non-active filament can be wound over the filament, trapping it onto the core at each end as the filament reaches that end and reversal of traverse occurs. Such a strand or strands can be made from a melt adhesive type polymer and heat would then be applied at the point at which the strand traps the hollow filament. Alternatively, a melt adhesive can be applied by nozzle or other applicator to the filament and the core at the reversal point, initially to the mandrel and then to the filaments as the method proceeds in building the bundle. Quickset adhesives could also be used or adhesives used in a fast evaporating solvent which is sprayed onto the filament at each reversal position. Liquid carbon dioxide could be such a solvent. The filaments can also be pressed and heated by a roller or anvil to effect a melt bonding of the filaments to the core or to subsequent filament layers and then filament to filament as they are laid down and secured at the ends of the mandrel surface. Other means can be used which provide sufficient holding action to secure the filaments at the end of each traverse, such as a velcro-like pad or a "whisker-disk". The filament loops which are formed by the traverse arm at the end of each pass can be engaged by a thin hook, wire or pin which is moved into the path of the filament at the point of reversal to prevent it from pulling out of position for a length of time sufficient for bonding or other securing means to become effective. Such a hook would then be retracted during the traverse cycle so that it could repeat its engagement operation on the next length of filament to reach it. It is possible that the securing operation can be combined with the potting procedure using a material which is compatible with or the same as the final potting resin, so that by the time the formation of the bundle has been complete by the laydown of hollow filaments, the potting is also essentially complete at both ends of the bundle. The filament bores could then be opened at one or both ends of the bundle after full curing of the potting resin has been accomplished if such a post cure is required.

The traverse element can engage a group of filaments, for example 5 to 20 hollow filaments, and apply these to the core as a "ribbon". Such hollow filaments can have been grouped together in a previous step by spinning or coating or gathered together just for bundle winding. Two or more traverse elements can be moved synchronously with feeding filaments to adjacent and circumferentially displaced locations on the core. When several filaments are simultaneously laid down, the traverse and rotation speeds are to be slow enough to allow sufficient "dwell" time at each point of reversal and thereby facilitate the step of securing the filaments at each end of the bundle.

As an alternative embodiment, a filament bundle ca n be built according to this invention by employing a core Which tapers slightly in diameter from one end to the other. The effect of such a shape would be to provide a somewhat more dense packing of hollow filaments at the narrow end of the core than at the wider end. This would result in some beneficial affects on flow of feed within the bundle when the feed is introduced into the bundle at the lower packing density end.

These and other embodiments of our invention will be apparent to those skilled in the art from the foregoing description and drawings without departing from the spirit or scope of our invention.

We claim:

1. A method of forming a hollow filament membrane bundle from continuous strands of filament by laying down lengths thereof onto an axially extensive rotatable support member along paths determined by moving a feed-on point so that filament lengths follow helical paths and build enwrapping layers in which all lengths share a common helix direction, including:

(a) rotating said support member in a given direction while repetitively and alternatingly moving the feed-on point axially from end to end of the bundle;

(b) reversing the direction of rotation of said support member whenever the axial direction of the feed-on point is reversed until a first number of lengths have been laid down, said first number selected to create a first layer of filament lengths enwrapping the bundle;

(c) after laying down said first selected number of lengths, the direction of rotation is not reversed one time when there is a reversal of the direction of the axial movement of the feed-on point, so that the next length of filament is laid down in a helix direction opposite to that of the lengths of filament forming said first layer;

(d) thereafter continuing to alternate the axial movement of the feed-on point and direction of rotation of the support member until a second number of lengths have been laid down in said opposite helix direction, the said number of lengths selected to create a second layer of filament lengths enwrapping the bundle; and (e) repeating steps (c) and (d) to effect accumulation of successive layers of filament lengths all lying in a common helix direction but in the opposite direction from filament lengths in adjacent layers until a desired bundle diameter is reached.

2. The method of claim 1 which comprises:

(a) laying down a first length of hollow filament on a mandrel having a right cylindrical surface symmetrical about its axis and an aspect ratio greater than one, said laying down extending from a first point at or near a first circular edge of said surface to a second point at or near a second circular edge;

(b) during said step (a), rotating said mandrel in one direction about said axis so that the path of the length of filament so laid down forms a helix angle with said axis in a first helix direction;

(c) guiding the path of the filament from said second point to a third point at or near said second edge displaced circumferentially around said second edge from the said second point;

(d) laying down a second length of filament on said mandrel from said third point to a fourth point at or near said first edge;

(e) rotating said mandrel during step (d) in the opposite direction of rotation as the step (b) direction so that the path of the filament length laid down in step (d) is parallel to but not overlying the path of said first length of filament;

(f) continuing to lay down lengths of filament in multiple passes back and forth on said mandrel surface alternating said passes from points at or near said first edge to points at or near second edge and from points at or near said second edge to points at or near said first edge while rotating said mandrel in opposite directions for alternate passes along the mandrel, so that each pass lays down a length of filament along a path parallel to but not overlying the path of the length laid down on said surface in the immediately preceding pass until a sufficient number of filament lengths has been laid down to create an enwrapping layer of filament lengths all sharing a common helix direction and angle to the mandrel axis and at a desired packing density, thereby forming said first layer;

(g) then, without interrupting the alternation of the edge-to-edge traverse of the lay-down point, eliminating the reversal of mandrel rotation one time, whereby the next length of filament laid down follows a helical path opposite in direction to the paths of the filament lengths comprising said first layer and continuing the lay-down of filament lengths along paths having an opposite helix direction to the filament lengths comprising said first layer until a sufficient number of filament lengths have been laid down to create an enwrapping layer of filament lengths all sharing a common helix direction and angle to the mandrel axis thereby forming said second layer wherein the filaments lie in the opposite helix direction to those of the first layer; and (h) repeating steps (f) and (g) until a sufficient number of layers have been accumulated to form a bundle of specific diameter and filament packing density comprising a plurality of enwrapping layers wherein the filaments of any layer share a common helix angle and direction and filaments in adjacent layers are oriented in opposite helix direction without interlacing of filaments of opposite helix direction.

3. The method of claim 2 wherein said mandrel has a first essentially hemispherical end-surface adjoining said first edge and a second essentially hemispherical end-surface adjoining said second edge and the path of each filament segment displaced circumferentially at either edge follows the circumference of one or the other of said end-surfaces.

4. The method of claim 1 wherein the reversal of rotation and the reversal of the axial direction of the feed-on point are slightly asynchronous whereby the path of any length of filament laid down is parallel to but does not lie atop the path of the immediately preceding length laid down.

5. The method of claims 1-4 including reciprocatively moving a guide engaged by a carrier along a line parallel to the axis of the mandrel to provide the end-to-end motion of the feed-on point.

6. The method of claim 5 including driving the reciprocating carrier with a lead screw, whose speed and direction of rotation are controlled.

7. The method of claim 5 including moving the carrier with a chain or belt.

8. The method of claims 1-4 or 6-7 including adjusting a speed of rotation of the mandrel or a speed of the feed-on point from layer to layer as the bundle diameter increases to adjust the helix angle of the filament lengths in successively laid-down layers whereby the path lengths of filaments are maintained within some specific range.

* * * * *